US008965333B1

(12) United States Patent
Shreiber et al.

(10) Patent No.: US 8,965,333 B1
(45) Date of Patent: Feb. 24, 2015

(54) REMOTE MONITORING SYSTEM AND METHOD UTILIZING WIRELESS NETWORK

(76) Inventors: Michael A. Shreiber, Carmichael, CA (US); Richard M. Shreiber, Deltona, FL (US)

(*) Notice: Subject to any disclaimer, the term of this patent is extended or adjusted under 35 U.S.C. 154(b) by 352 days.

(21) Appl. No.: 13/572,662

(22) Filed: Aug. 12, 2012

Related U.S. Application Data

(60) Provisional application No. 61/524,304, filed on Aug. 16, 2011.

(51) Int. Cl.
*H04M 11/00* (2006.01)
*H04W 24/00* (2009.01)
*G08C 15/06* (2006.01)
*G08C 19/04* (2006.01)
*H04M 15/00* (2006.01)

(52) U.S. Cl.
USPC ...... 455/408; 455/406; 455/425; 340/870.03; 340/870.11; 379/114.01; 379/114.07

(58) Field of Classification Search
CPC ......... G01D 4/00; G01D 4/002; G01D 4/004; G01D 4/006; G01D 7/00; G01D 9/00; G01D 21/00; G06Q 30/04; G06Q 50/06; H04W 4/24; H04W 4/26; H04W 88/02; H04W 88/18; H04L 12/14; H04L 12/1403; H04L 12/1428; H04L 12/1453; H04L 12/1482; H04L 12/1485; H04L 12/26; H04L 12/2602; H04L 12/2618; H04L 12/2623; H04L 12/2628; H04M 15/00; H04M 15/10; H04M 15/12; H04M 15/28; H04M 15/44; H04M 15/80; H04M 15/8022; H04M 15/82; H04M 15/8214; H04M 15/8242; H04Q 2209/00; H04Q 2209/40; H04Q 2209/50; H04Q 2209/60; H04Q 2209/70; Y02B 90/24; Y02B 90/241; Y02B 90/246; Y04S 20/30; Y04S 20/32; Y04S 20/42
USPC ........... 455/405–408, 414.1–414.4, 418–420, 455/423–425, 445, 560–561; 340/870.01–870.11; 379/114.01–127.05
See application file for complete search history.

(56) References Cited

U.S. PATENT DOCUMENTS

2009/0109056 A1* 4/2009 Tamarkin et al. ........ 340/870.02
2009/0215411 A1* 8/2009 Tucker et al. ................ 455/90.2
2010/0130170 A1* 5/2010 Liu et al. ...................... 455/411

* cited by examiner

Primary Examiner — Michael Mapa
(74) Attorney, Agent, or Firm — Dennis A. DeBoo

(57) ABSTRACT

A remote monitoring system and method that packages, transmits, receives, decodes, stores, and distributes data sent from remote monitoring devices via a wireless network and that provides manufacturers with reduced wireless manufacturing expenses, data collection costs, dissemination costs, and wireless network access fees.

20 Claims, 10 Drawing Sheets

REMOTE MONITORING SYSTEM AND METHOD UTILIZING WIRELESS NETWORK

CROSS-REFERENCE TO RELATED APPLICATIONS

This application claims priority under 35 USC Section 119(e) to U.S. Provisional Patent Application No. 61/524,304, filed Aug. 16, 2011, the entire disclosure of which is incorporated herein by reference.

FIELD OF THE INVENTION

This invention relates generally to a remote monitoring system and method utilizing a wireless network and, in particular, to a remote monitoring system and method for packaging, transmitting, receiving, decoding, storing, and distributing data sent from remote monitoring devices via a wireless network.

BACKGROUND OF THE INVENTION

Currently, manufacturers or distributors do not have a cost effective solution for bringing wireless monitoring devices to market when the device needs to send only tiny amounts of data (microdata) because the use of standard cellular technology for transmitting small amounts of data (microdata) is inefficient and cost prohibitive due to a number of factors. These factors include: Cellular carriers charging significant minimum fees for network access and bandwidth usage; Data collection and dissemination requiring a significant investment in supporting infrastructure as each customer has different data requirements; Product development requiring specialized expertise; Multiple vendors for products and services being required; and Costly billing and accounting processes for thousands of active devices.

Accordingly, there is a need for a remote monitoring system and method that, inter alia, overcomes one or more of the significant shortcomings delineated hereinabove.

BRIEF SUMMARY OF THE INVENTION

Accordingly, and in one aspect, an embodiment of the invention ameliorates or overcomes one or more of the significant shortcomings of the known prior art by providing a remote monitoring system and method for packaging, transmitting, receiving, decoding, storing, and distributing data sent from remote monitoring devices via wireless network.

More specifically, and in one aspect, an embodiment of the invention provides a system comprising a remote monitoring device comprised of a remote data packaging and transmission module (PTM) that is operatively coupled to a remote monitoring module and wirelessly coupled to a centralized data routing engine (DRE). The system utilizes the remote data packaging and transmission module to perform all wireless connectivity and transmission processes for the remote monitoring device. The data packaging and transmission module is data-agnostic and receives data from the remote monitoring module and encodes that data along with other meta information such as date/time stamp, device ID such as a SIM ID, et cetera.

The remote data packaging and transmission module packages (encodes and encrypts) this data and makes a connection to a local cellular network. Once connected, the remote data packaging and transmission module will establish a data connection to the Internet and transmit data to the centralized data routing engine. Once an Internet connection is established, the remote data packaging and transmission module uses standard HTTP/HTTPS protocol to post its packaged data to the centralized data routing engine.

The centralized data routing engine then processes and disseminates the data according to a predefined and updateable directive such as a manufacturer's directive. This centralized data routing engine functionality allows the manufacturer to create any number of remote monitoring devices and remote monitoring device types utilizing the same data packaging and transmission module and centralized data routing engine thereby allowing manufacturers to significantly reduce manufacturing time and expense.

The centralized data routing engine receives and processes all data from all of the remote monitoring devices. Data from different remote monitoring device types is handled differently by creating a separate decoding and routing protocol (DRP) for each remote monitoring device type on the centralized data routing engine. Even groups of remote monitoring devices within the same device type can easily be decoded and routed to separate locations by establishing a separate decoding and routing protocol for different groups of remote monitoring devices. By offloading the data routing and dissemination functions to a centralized service, the manufacturer has complete control of the disposition of the data for each remote monitoring device. The data can be stored or redirected transparently and without needing to interact with the remote monitoring device itself.

The system utilizes the centralized data routing engine for tracking the amount of data and all of the bandwidth usage for each remote monitoring device. The supplier of the method of the system aggregates the total bandwidth used by all devices accessing the centralized data routing engine and purchases the required bandwidth from a carrier in bulk. The supplier then aggregates the total amount of bandwidth used by each manufacturer's devices and sends the manufacturer a single invoice, for the total bandwidth used, at a contracted rate thereby allowing the manufacturer to streamline billing processes for activating thousands of remote monitoring devices.

In another aspect, an embodiment of the invention provides a remote monitoring method, said method comprising: utilizing each of a plurality of remote monitoring devices for forming a plurality of contiguous data packages each comprising encoded monitored data and a unique identifier; wirelessly transmitting each of the plurality of contiguous data packages from each of the plurality of remote monitoring devices to a cellular network; transferring each of the plurality of contiguous data packages from the cellular network to a server; processing, with the server, each of the plurality of contiguous data packages with at least one of a plurality of predefined decoding and routing protocols selected as a function of each unique identifier contained within each of the plurality of contiguous data packages for obtaining a plurality of decoded data sets each comprising decoded monitored data and an associated routing directive; routing each of the plurality of decoded data sets according to its associated routing directive; aggregating a total amount of bandwidth used by each wireless transmission of each of the plurality of contiguous data packages; and invoicing singularly an entity for only the aggregated amount of bandwidth used by each wireless transmission of each of the plurality of contiguous data packages having its unique identifier associated with the entity.

In another aspect, an embodiment of the invention provides a remote monitoring method, said method comprising: providing a plurality of remote data packaging and transmission devices each connectable to a data monitoring device configured to collect data correlative to at least one human physiological measurement for defining monitored data; utilizing each of the plurality of remote data packaging and transmission devices for forming a plurality of contiguous data packages each comprising encoded monitored data and a unique identification code; wirelessly transmitting each of the plurality of contiguous data packages from each of the plurality of remote data packaging and transmission devices to a cellular network; transferring each of the plurality of contiguous data packages from the cellular network to a server; processing, with the server, each of the plurality of contiguous data packages with at least one of a plurality of predefined decoding and routing protocols selected as a function of each unique identification code contained within each of the plurality of contiguous data packages for obtaining a plurality of decoded data sets each comprising decoded monitored data and an associated routing directive; routing each of the plurality of decoded data sets according to its associated routing directive to at least one of a plurality of predefined end points for disposition; aggregating a total amount of bandwidth used by each wireless transmission of each of the plurality of contiguous data packages; and invoicing singularly an entity for only the aggregated amount of bandwidth used by each wireless transmission of each of the plurality of contiguous data packages having its unique identifier associated with the entity.

In another aspect, an embodiment of the invention provides a remote monitoring system comprising: a plurality of configurable remote data packaging and transmission devices each with an interchangeable firmware module and an interface connector capable of receiving differing data types defining monitored data via differing connection types; said plurality of configurable remote data packaging and transmission devices configured to form a plurality of contiguous data packages each comprising encoded monitored data and a unique identifier; said plurality of configurable remote data packaging and transmission devices configured to wirelessly transmit each of said plurality of contiguous data packages from each of said plurality of configurable remote data packaging and transmission devices to at least one cellular network configured to transfer each of said plurality of contiguous data packages from at least said one cellular network to a server; said server configured to process each of said plurality of contiguous data packages with at least one of a plurality of predefined processing protocols selected as a function of each said unique identifier contained within each of said plurality of contiguous data packages for obtaining a plurality of decoded data sets each comprising decoded monitored data and an associated routing directive; said server configured to route each of said plurality of decoded data sets according to its associated routing directive; said server configured to aggregate a total amount of bandwidth used by each said wireless transmission of each of said plurality of contiguous data packages; and said server configured to invoice singularly an entity for only said aggregated amount of bandwidth used by each wireless transmission of each of said plurality of contiguous data packages having its unique identifier associated with said entity.

In another aspect, an embodiment of the invention provides a remote monitoring system comprising: a plurality of remote data packaging and transmission devices each connectable to a data monitoring device configured to collect data correlative to at least one human physiological measurement for defining monitored data; said plurality of remote data packaging and transmission devices configured to form a plurality of contiguous data packages each comprising encoded monitored data and a unique identifier; said plurality of remote data packaging and transmission devices configured to wirelessly transmit each of said plurality of contiguous data packages from each of said plurality of remote data packaging and transmission devices to a cellular network configured to transfer each of said plurality of contiguous data packages from the cellular network to a server; said server configured to process each of said plurality of contiguous data packages with at least one of a plurality of predefined processing protocols selected as a function of each said unique identifier contained within each of said plurality of contiguous data packages for obtaining a plurality of decoded data sets each comprising decoded monitored data and an associated routing directive; said server configured to route each of said plurality of decoded data sets according to its associated routing directive; said server configured to aggregate a total amount of bandwidth used by each said wireless transmission of each of said plurality of contiguous data packages; and said server configured to invoice singularly an entity for only said aggregated amount of bandwidth used by each wireless transmission of each of said plurality of contiguous data packages having its unique identifier associated with said entity.

Accordingly, it should be apparent that numerous modifications and adaptations may be resorted to without departing from the scope and fair meaning of the claims as set forth herein below following the detailed description of the invention.

DETAILED DESCRIPTION OF THE INVENTION

Figure 1:
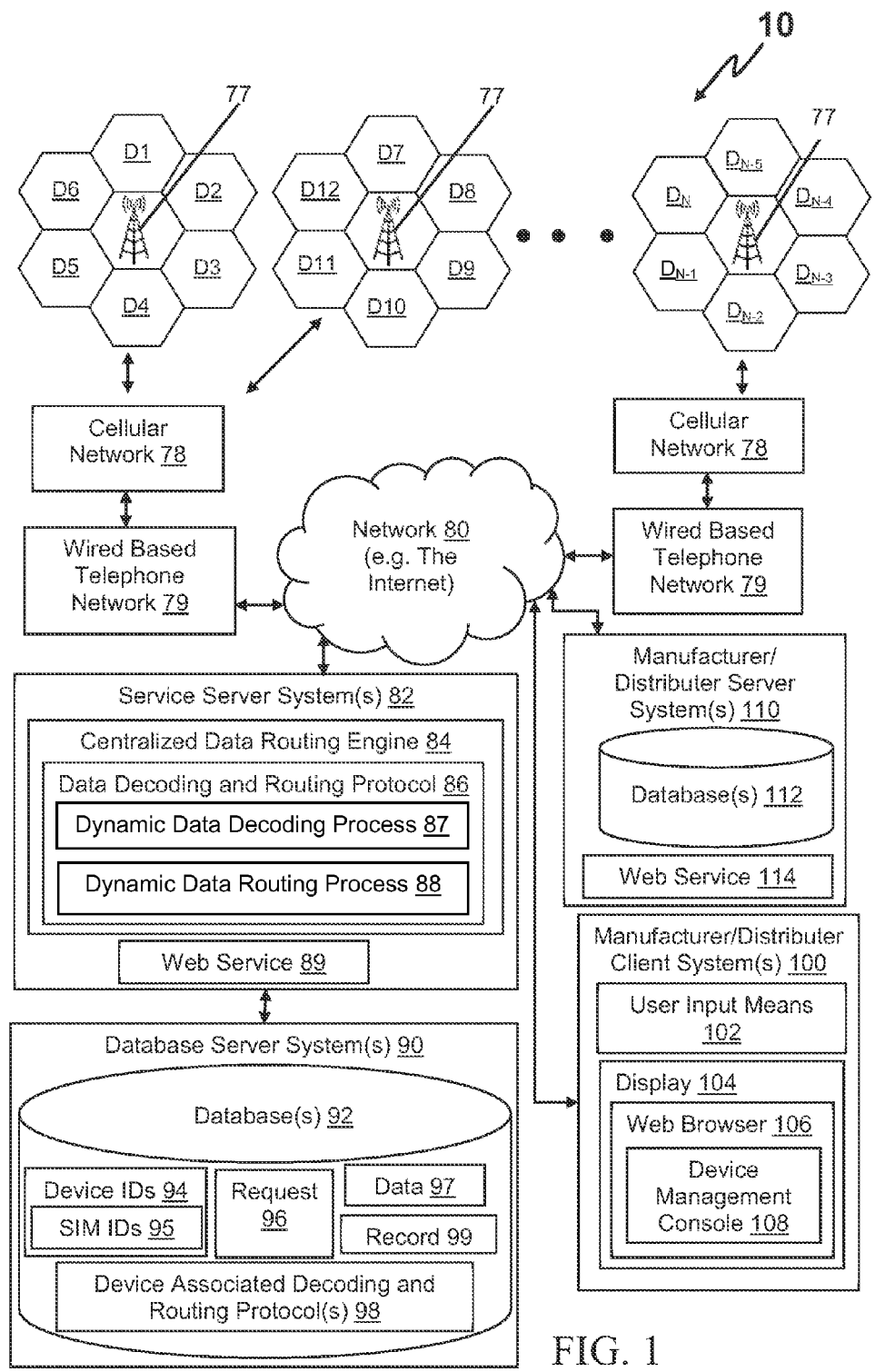
FIG. 1 is a block diagram illustrating an embodiment of a remote monitoring system.

Considering the drawings, wherein like reference numerals denote like parts throughout the various drawing figures, reference numeral 10 is directed to a remote monitoring system: apparatus and method.

System Overview

Figure 2:
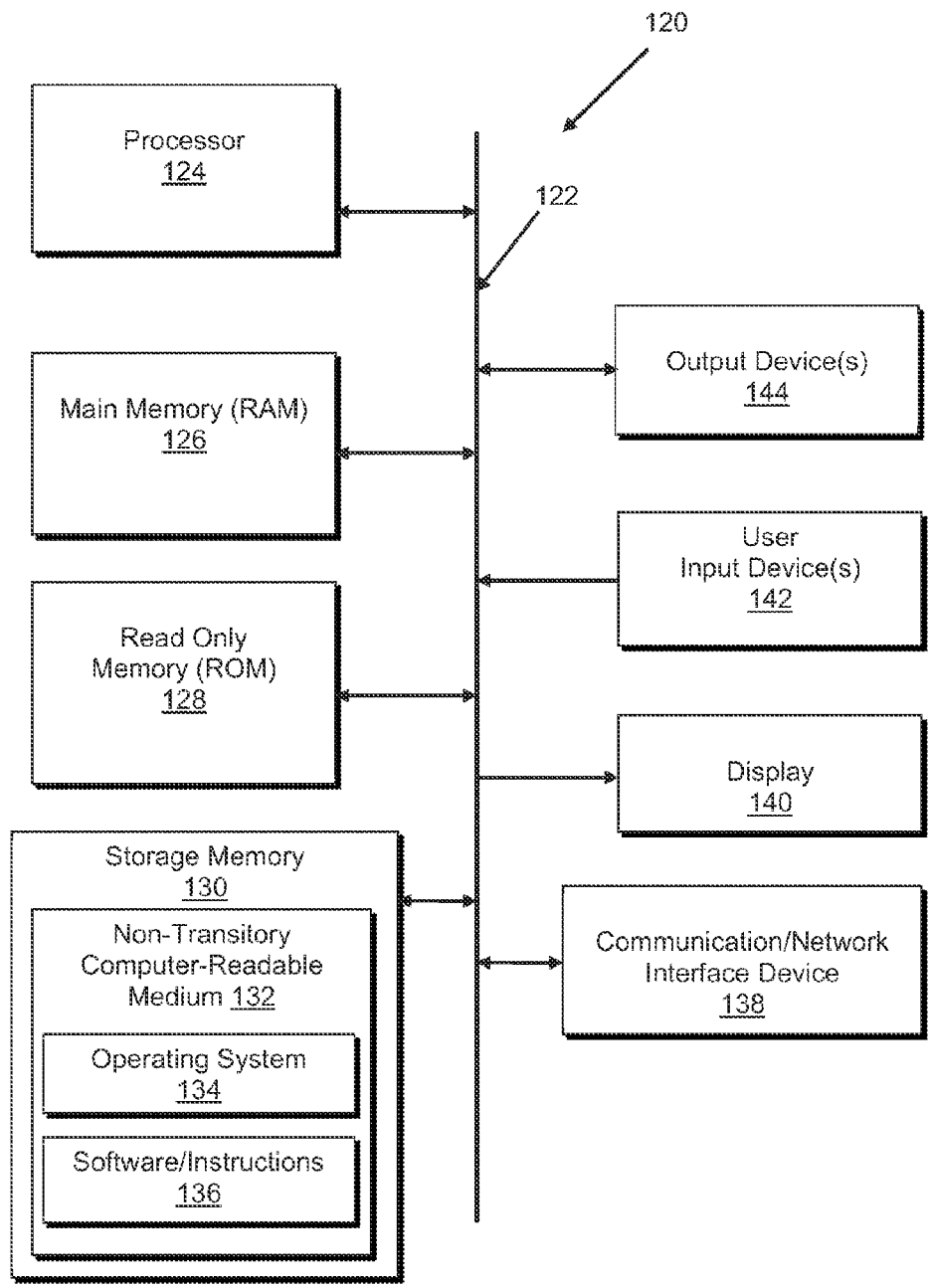
FIG. 2 is a block diagram illustrating a machine in an example form of a computer system which can generally define a server system or a client system of an embodiment of the remote monitoring system.
Figure 3:
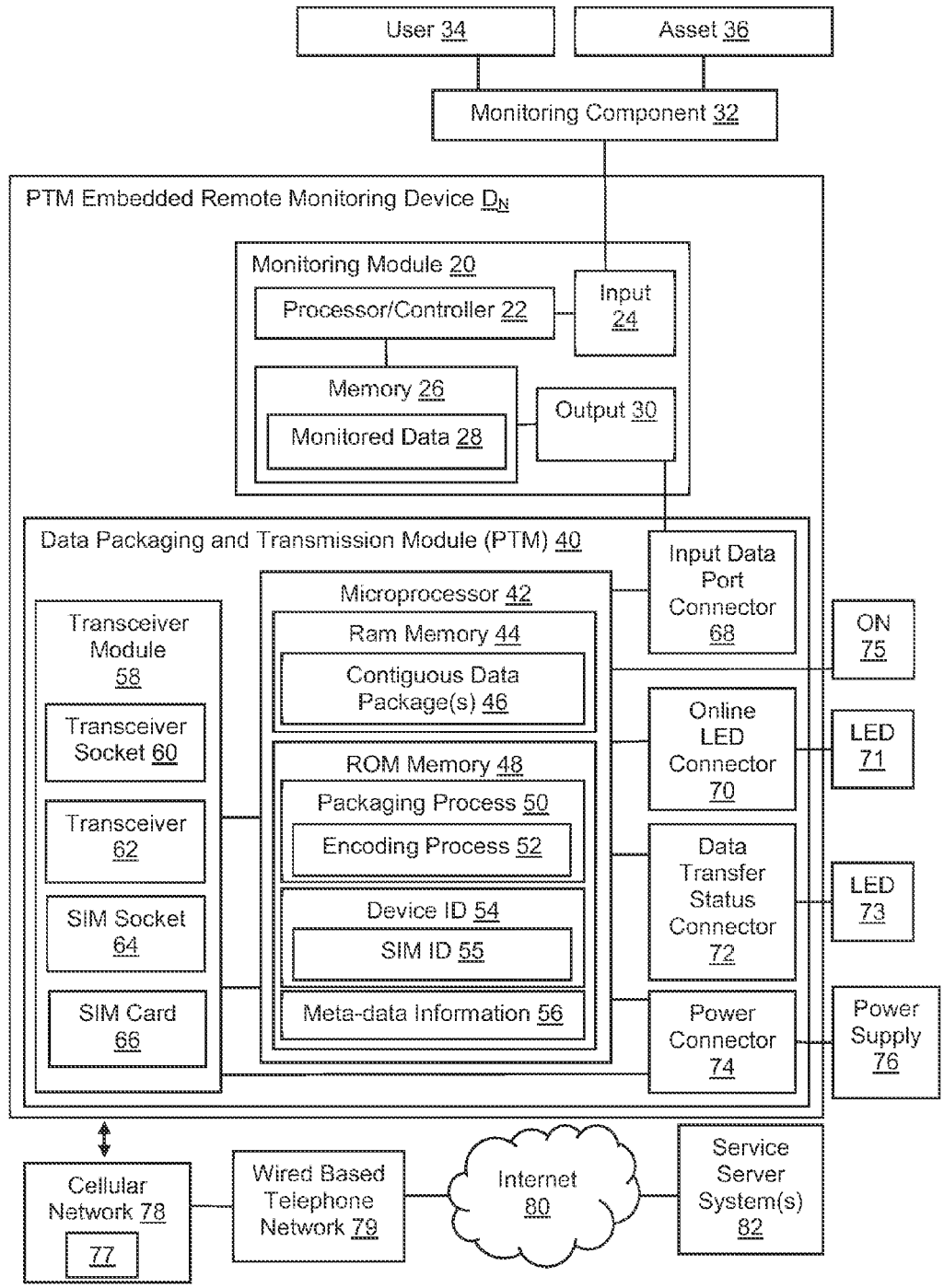
FIG. 3 is a block diagram illustrating an embodiment of a remote monitoring device of an embodiment of the remote monitoring system.

Referring to FIGS. 1 through 3, and in one embodiment, the remote monitoring system 10 is comprised of a plurality of remote monitoring devices D1 through $D_N$ operatively coupled to a service server system 82 by utilizing a cellular network 78 comprising one or more cellular tower/base station units 77. Each of the plurality of remote monitoring devices D1 through $D_N$ is comprised of a data packaging and transmission module (PTM) 40 operatively coupled to a monitoring module 58. The data packaging and transmission module (PTM) or device 40 packages data received from the monitoring module or device 20 into contiguous data blocks, packets, or packages 46 and wirelessly transmits the packages 46 to one or more of the ver/base station units 77 of the cellular network 78. In turn, the cellular network 78 utilizes a connection with, for example, a wired based telephone network 79 to access a network such as the internet 80 operatively coupled to the service server system 82 to send the packages 46 to the service server system 82 via, for example, HTTP/HTTPS requests. The service server system 82 comprises a centralized data routing engine 84 comprised of a data decoding and routing protocol 86 comprising a dynamic data decoding process 87 and a dynamic data routing process 88 for parsing the packages 46 and selecting an appropriate protocol as a function of a unique remote monitoring device ID code or identifier 54 such as a SIM ID code 55 and to decode and route the data to an appropriate manufacturer or distributer client system 100 operatively coupled to the service server system 82 via a connection with Internet 80.

Additionally, the remote monitoring system 10 is further comprised of a database server system 90 operatively coupled to the service server system 82, and an optional manufacture or distributer server system 110 operatively coupled to the service server system 82 and the client system 100 via Internet 80.

In one embodiment, the service server system 82, the database server system 90, the manufacture or distributer client system 100, and the optional manufacture or distributer server system 110 can be, for example, a machine within which a set of instructions may be executed by a processor for causing the machine to perform the associated methodologies delineated herein. Further, the term "machine" can also be taken to include any collection of machines that individually or jointly execute a set (or multiple sets) of instructions to perform one or more of the associated methodologies delineated herein.

FIG. 2 generally illustrates an exemplary diagram of this machine in the form of a computer system 120 comprised of a bus 122, a processor 124 (e.g., one or more central processing units (CPUs), one or more graphics processing units (GPUs), or both), RAM or main memory 126, read only memory (ROM) 128, and a storage memory 130 comprising a non-transitory computer-readable medium 132. The computer system 120 also includes a communication or network interface device 138 for communicating with another machine or system via a network, such as Internet 80. Furthermore, the computer system 120 includes a display 140 (e.g., a liquid crystal display (LCD) or a cathode ray tube (CRT)) and one or more user input devices 142 such as a keyboard, a mouse, a pen, a trackball, a remote control, a joystick, a touch screen, a keypad, voice and/or speech recognition and/or biometric mechanisms, et cetera. Moreover, the computer system 120 may include one or more output devices 144 such as a printer, a speaker, et cetera. In one embodiment, bus 122 includes one or more conductor or communication paths that permit communication among the components of the computer system 120.

In one embodiment, the non-transitory computer-readable medium 132 stores an operating system 134 and software or instructions 136 embodying or utilized by any one or more of the methodologies or functions described herein. The software or instructions 136 may also reside, completely or at least partially, within the RAM memory 126 and/or within the processor 124 during execution thereof by the computer system 120 wherein the RAM memory 126 and the processor 124 also constituting non-transitory computer-readable media. Software or instructions 136 may further be transmitted or received over the network 80 via the network interface device 138 utilizing any one of a number of well-known transfer protocols e.g., HTTP/HTTPS).

While the non-transitory computer-readable medium 132 is shown in an example embodiment to be a single medium, the non-transitory computer-readable medium 132 should be taken to include a single medium or multiple media that is capable of storing, encoding, or carrying a set of instructions for execution by the computer system 120 and that cause the computer system 120 to perform any one or more of the methodologies or functions described herein, or that is capable of storing, encoding or carrying data structures utilized by or associated with such a set of instructions. The term "non-transitory computer-readable medium" shall accordingly be taken to include, but not be limited to, magnetic media (such as hard disks, floppy disks, et cetera), optical media (such as compact discs, digital video discs, Blu-ray discs, et cetera), semiconductor media (such as non-volatile flash memory employed in, for example, solid-state drive (SSD) devices, electrically programmable read only memory (EPROM), electrically erasable programmable read only memory (EEPROM), et cetera), any suitable media that is not fleeting or devoid of any semblance of permanence during transmission, and/or any suitable tangible media. Additionally, non-transitory computer readable medium 132 may be employed for at least a portion of RAM 126. Furthermore, the non-transitory computer readable medium 132 and storage memory 130 can be formed from one or more different types of media or memory.

Communications Overview

Still referring to FIGS. 1 through 3, protocols and components for wirelessly communicating between cellular networks 78 including towers/base stations 77 and the Internet 80 along with protocols and components for communicating between the Internet 80 and servers 82, 90, and 110 and clients 100 are well known to those of ordinary skill in the art of network communications. For example, it is well-known in the art of network communications that Internet 80 is a collection of networks and gateways that utilize a TCP/IP suite of protocols wherein TCP/IP is a dual acronym for Transmission Control Protocol/Internet Protocol and it is also well-known in the art of network communications that the primary way that cellular technology accesses the internet is through a protocol called wireless access protocol (WAP) and its associated markup language, the wireless markup language (WML).

The service server system 82 and the manufacture or distributer server system 110 are generally each comprised of a computer system 120 running a server operating system which is an embodiment of the operating system 134 that is responsible for the TCP/IP communications.

Each manufacture or distributer client system 100 is also generally comprised of a computer system 120 running both an operating system which is an embodiment of the operating system 134 that is responsible for the TCP/IP communications and a software application known as a web browser 106. Using TCP/IP, each manufacture or distributer client system 100 employs the web browser 106 to interact with the server systems 82 and 110 via Internet 80. In turn, the servers systems 82 and 110 include and execute server software that presents information as HTTP responses in the form of the web pages constructed from a Markup Language, and/or other server-generated application or data which is displayed by the web browser 106 via a display 104 of the manufacture or distributer client system 100 wherein display 104 is an embodiment of the display 140 of the computer system 120. Most web browsers 106 have modern graphical user interfaces that are capable of displaying and manipulating various types of data. A graphical user interface is a type of display format that enables a user to choose commands, start programs, and see lists of files and other options by pointing to pictorial representations (icons) and lists of menu items on the display. Choices can be activated generally by a user input devices 102 which are an embodiment of the user input devices 142 of the computer system 120.

Additionally, the service server system 82 is also generally responsible for data exchange in cooperation with one or more database server systems 90. In general, each database 92 is accessed and controlled through a common gateway interface as is well-known in the art of network communications.

System Specifics

FIG. 3 illustrates an embodiment of a PTM embedded remote monitoring device $D_N$ wherein N is a positive integer greater than zero thereby representing any one of the plurality of remote monitoring devices D1 through $D_N$ illustrated in FIG. 1. Remote monitoring device $D_N$ is comprised of any third party monitoring module or device 20 and the data packaging and transmission module (PTM) or device 40.

Monitoring Module 20

In one embodiment, the monitoring module 20 is comprised of a processor/controller 22 operatively coupled to an input 24, a memory 26 for storing monitored data or readings 28, and an output 30. In addition, monitoring module 20 can comprise an internal or external monitoring component 32 that is operatively coupled between the input 24 and a user 34 or asset 36 for obtaining monitored data 28 therefrom and which, in turn, is passed to the packaging and transmission module 40 via output 30. In one embodiment, output 30 is in the form of a standard serial connection, but other means can be used.

In one embodiment, the monitoring module 20 is formed from, but not limited to, any device that collects or generates data and has an accompanying serial data port with which it can transfer its data to the packaging and transmission module (PTM) 40. Additionally, and in one embodiment, the monitoring module 20 can take the form of, but is not limited to, medical devices such as blood pressure cuffs, glucose monitors, weight scales, et cetera; environmental monitors such as weather, temperature, and humidity monitors; and time and attendance devices such as time clocks and access control systems. Furthermore, and in one embodiment, the monitoring module 20 can take the form of, but is not limited to, any device or process for monitoring an asset including an asset process in the form of, for example, an industrial asset, a utility asset, a business asset, a medical asset, a transportation asset, a financial asset, a biological asset, and other processes and/or apparatuses. Accordingly; and in one embodiment, the monitoring module 20 can take the form of, but is not limited to, any device or process for monitoring, for example, a system, a process, an apparatus and/or a signal source.

Packaging and Transmission Module (PTM) 40

Still referring to FIG. 3, an embodiment of the packaging and transmission module (PTM) 40 is comprised of a microprocessor 42 having internal and/or external RAM and ROM memories 44 and 48 respectively. Additionally, the packaging and transmission module (PTM) 40 is further comprised of a transceiver module 58 operatively coupled to the microprocessor 42 and comprising a transceiver socket 60, a transceiver 62 operatively coupled to the transceiver socket 60, a SIM socket 64, and a SIM Card 66 operatively coupled to the SIM socket 64. Furthermore, the packaging and transmission module (PTM) 40 is further comprised of an input data port connector 68 operatively coupled to the output 30 of the monitoring module 20 and to microprocessor 42, an online LED input connector 70 operatively coupled to external LED 71 and to microprocessor 42, a data transfer status connector 72 operatively coupled to external LED 73 and to microprocessor 42, and a power connector 74 operatively coupled to microprocessor 42 and to an internal or external power supply 76 that supplies power to the remote monitoring device $D_N$. In one embodiment, a one button simplicity switch 75 is operatively coupled to microprocessor 42 to activate a data retrieval d transmission process delineated in detail hereinbelow.

In one embodiment, the microprocessor 42 is configured to handle all the functions necessary to receive monitored data 28 from, for example, the monitoring module 20, create contiguous data blocks, packets, or packages 46, and control the cellular transceiver module 58.

At the outset, the microprocessor 42 receives monitored data 28 from the monitoring module 20 via, for example, a standard serial connection between output 30 of module 20 and the input data port connector 68 of module 40. Once received, the microprocessor 42 executes a packaging process 50 which is stored in ROM memory 48 and which is comprised of computer-executable instructions that, when executed by the microprocessor 42, cause the microprocessor 42 to perform the packaging process 50 which includes an encoding process 52 for transforming the monitored data 28 into contiguous data packages 46 which can be stored in RAM memory 44 and which are comprised of encoded data along with meta information comprised of date and time stamp, a device ID code or identifier 54 such as a SIM ID code, et cetera. In one embodiment, the ROM memory 48 is configurable or reconfigurable by being flashed with device-specific firmware to allow it to receive device data from different monitoring modules or devices 20.

With the monitored data 28 packaged into at least one contiguous data package, block, or packet 46, the microprocessor 42 transfers at least the one data package 46 to the transceiver module 58. In turn, the transceiver module 58 then makes a connection to one or more local cellular tower/base station units 77 and thus, to a cellular network 78 such as a GPRS cellular network. Once connected, the packaging and transmission module (PTM) 40 initiates a TCP/IP connection to the centralized service data routing engine (DRE) 84 (FIG. 1) of the service server system 82 via Internet 80 using the Hyper Text Transfer Protocol (HTTP/HTTPS) and transmits, posts, or offloads at least the one contiguous data package 46 to the centralized data routing engine 84 of the service server system 82.

In one embodiment, the packaging and transmission module (PTM) 40 automatically locates and connects to the cellular tower/base station unit 77 that is closest in proximity when the packaging and transmission module (PTM) 40 is powered on thereby providing interact access thereto. Additionally, and in one embodiment, the transceiver model 58 in the packaging and transmission module (PTM) 40 can be switched so that the module 40 can use both the GSM network or the CDMA network.

Additionally, the transceiver module 58 utilizes a modular design whereby any number of third party cellular transceivers 62 can be coupled to the standard transceiver socket 60. This provides the packaging and transmission module (PTM) 40 with several advantages: Ability to connect to disparate cellular systems (CDMA, GSM); Future upgrades to newer systems and technology; and Compatibility with multiple module manufacturers.

This modular design also allows the SIM Card 66 to be removed and replaced as necessary. The SIM Card 66 provides an identification means used by the transceiver module 58 and is required when the cellular transceiver 62 uses the GSM network. When using CDMA, the SIM Card 66 is not used.

The packaging and transmission module (PTM) 40 also provides an embodiment of the input data port connector 68 that is in the form of, but not limited to, a set of wires that make up a standard serial port configuration (rx, tx, gnd). The microprocessor 42 receives monitored data 28 through the input data port connector 68 receiving monitored data 28 from the output 30 of the monitoring module 20. Since each monitoring module 20 may have different physical requirements for interconnect (type of connector, size of connector, pin placements, et cetera), the wires from this jumper can be connected to a data cable specially configured to meet the needs of the module it will be attached to. In addition, this you 68 can be internally configured to meet the data specifications of the attached device. Transmission speed (baud rate) as well as voltage (RS232 or TTL) can be set via internal commands and external jumpers on the packaging and transmission module (PTM) 40.

Additionally, the packaging and transmission module (PTM) 40 provides an embodiment of the online LED input connector 70 that is operatively coupled between microprocessor 42 and external LED 71 to indicate the cellular status of the packaging and transmission module (PTM) 40. When the module 40 is first powered on, the LED 71 blinks indicating it is searching for cellular service. Once the cellular service is located and the connection is established, the LED 71 stops blinking and stays on. As long as service is available, the LED 71 will stay lit. Should the service become unavailable, the LED 71 will begin blinking again until service resumes. This connector 70 allows the packaging and transmission module (PTM) 40 to attach LED 71 to the packaging and transmission module (PTM) 40 with an appropriate length of cable necessary for placement on the outside of a housing containing the packaging and transmission module (PTM) 40 and monitoring module 20.

Furthermore, the packaging and transmission module (PTM) 40 provides an embodiment of the data transfer status connector 72 that is operatively coupled between microprocessor 42 and the external LED 73 to indicate the current status of a data transfer through the cellular network 78, wired based telephone network 79, the internet 80, and to the waiting centralized data routing engine 84 of the service server system 82. When contiguous data packages, blocks, or packets 46 begin to transfer, the LED 73 begins blinking indicating the transfer process has begun. The LED 73 will continue to blink until the transfer process is complete or the transfer fails. When the transfer is complete, the LED 73 goes out. Should the transfer fail, the LED 73 will stop blinking and stay on. The packaging and transmission module (PTM) 40 will try to resend the data in a set period of time such as one or two minutes or more. The connector 72 allows the packaging and transmission module (PTM) 40 to attach LED 73 to the packaging and transmission module (PTM) 40 with an appropriate length of cable necessary for placement on the outside of a housing containing the packaging and transmission module (PTM) 40 and monitoring module 20.

Moreover, the power connector 74 enables the integrator of the packaging and transmission module (PTM) 40 to choose the power options they want. In one embodiment, the packaging and transmission module (PTM) 40 operates on 5 volts, 2 amps. An internal jumper can be connected by wires directly to the power supply 76 in the form of an AC power adapter (integrated power supply) or to another power connector for use with an external power supply.

Packaging and Transmission Module 40 Aspects

In one aspect, the packaging and transmission module (PTM) 40 is a highly configurable/reconfigurable module that can be used both standalone or as part of a larger embedded system.

In another aspect, the packaging and transmission module (PTM) 40 utilizes connectors to couple indicator lights, power, and data ports thereto so that the external housing of the remote monitoring device can be made with no concern for hole placement to accommodate fixed items. A manufacturer simply attaches the part with the desired cable length to reach the location on the outside of the housing. This allows for complete freedom of the physical design.

In another aspect, the packaging and transmission module (PTM) 40 utilizes configurable data options and can be configured to match existing speeds and voltages of current monitoring modules. The data port connector also for any cable configuration as well.

In another aspect, the packaging and transmission module (PTM) 40 allows for upgradeable/replaceable cellular modules and can use multiple modules from different carriers and manufacturers thereby ensuring that the same packaging and transmission module 40 has a longer lifecycle.

In another aspect, the packaging and transmission module (PTM) 40 employs an integrated cellular data plan and comes with a pre-configured cellular service. Customer does not need to locate and negotiate their own cellular plans.

Service Server System(s) 82

Referring now to FIGS. 1 and 3, and in one embodiment, the service server system 82 comprises the centralized data routing engine 84 which is comprised of the data decoding and routing protocol 86. In turn, the data decoding and routing protocol 86 comprises the dynamic data decoding process 87 and the dynamic data routing process 88 for parsing each received package 46 wirelessly transmitted from data packaging and transmission modules (PTM) 40 and selecting an appropriate protocol for each package 46 as a function of a comparison between the unique remote monitoring device ID code or identity 54 such as the SIM ID code 55 contained therein and a set of monitoring device ID codes 94 such as the SIM ID codes 95 stored in database 92 for decoding, storing, and routing the packaged data to an appropriate manufacturer or distributer client system 100 operatively coupled to the service server system 82 via a connection with Internet 80 as will be further delineated in detail hereinbelow.

Method Specifics

Referring now to FIGS. 4 through 7, and in one embodiment, the remote monitoring system 10 (FIG. 1) is comprised of a remote monitoring method 210 comprising packaging, transmitting, receiving, decoding, storing, and distributing data wirelessly transmitted from one or more of the remote monitoring devices $D_1$ through $D_N$.

Figure 4:
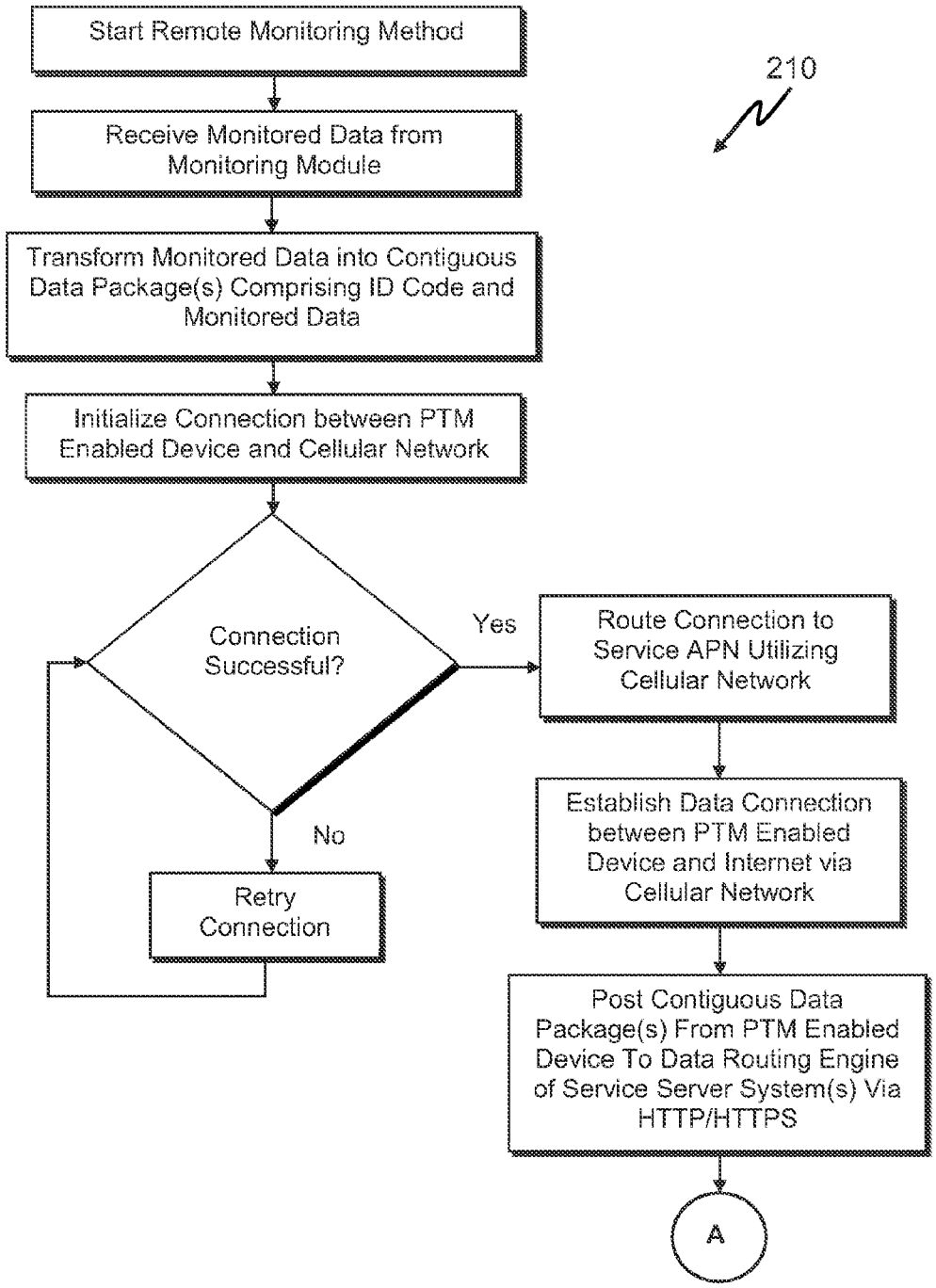
FIGS. 4 through 7 illustrate a process flow chart of an embodiment of a remote monitoring method.

More specifically, and with reference to FIGS. 1, 3, and 4, an embodiment of the remote monitoring method 210 comprises the following steps. Receiving, monitored data 28 from a monitoring module/device 20 previously or currently coupled to a user 34 or asset 36 via, for example, a monitoring component 32. Transforming the monitored data 28 into a contiguous encoded data package 46 comprising encoded monitored data 28 and meta information comprised of, for example, a date and time stamp and a device ID code or identifier 54 such as a SIM ID code 55 of the remote monitoring device. Then, initializing a connection between the data packaging and transmission modules (PTM) 40 and the cellular network 78.

Next, the remote monitoring method 210 comprises the steps of determining if the connection is successful or unsuccessful. If the connection is unsuccessful, then retrying the connection after a predefined period of time. If the connection is successful, then routing the connection to a service APN utilizing the cellular and wired networks 78 and 79 respectively. After a successful connection, the remote monitoring method 210 comprises establishing a data connection between the data packaging and transmission module (PTM) 40 and Internet 80 via the cellular and wired networks 78 and 79 respectively and then posting, sending, or transmitting the contiguous encoded data package 46 to the centralized data routing engine 84 of the service server system 82 via HTTP/HTTPS. Accordingly, the centralized data routing engine 84 is a cloud based service that receives transmissions from the packaging and transmission modules 40 via the HTTP/HTTPS protocol. The data routing engine 84 is made available via, a standard server platform capable of hosting web applications; Windows Server using IIS or Linux using Apache are examples. The data routing engine 84 also utilizes the database 92 of the database server system 90 such as Microsoft SQL Server to store data.

Figure 5:
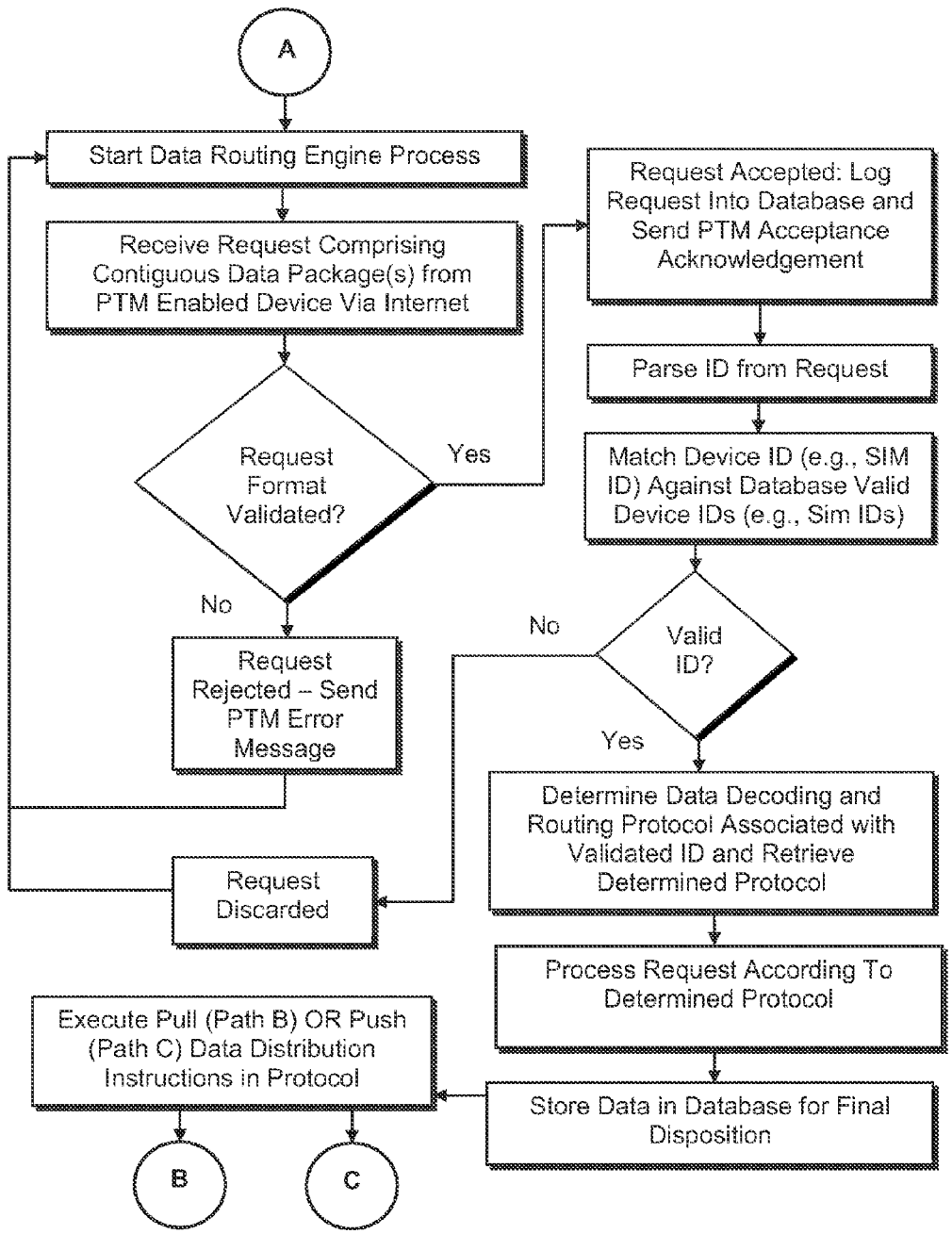

Now with reference to FIGS. 1, 3, and 5, an embodiment of the remote monitoring method 210 further comprises the following steps which outline a data routing engine process. Receiving a request comprising the contiguous encoded data package 46 from the packaging and transmission module 40 via the Internet 80. Determining if the request format is valid and if valid, then accepting the request 96, logging the request 96 into the database 92, and sending the packaging and transmission module 40 an acceptance acknowledgement, and if invalid, then rejecting the request and sending the packaging and transmission module 40 an error message. Then, parsing the device ID code or identifier 54 such as the SIM ID code 55 from the properly formatted request in order to determine the exact device that is transmitting. Next, matching the device ID code or identifier 54 such as the SIM ID code 55 against the database of valid device ID codes or identifiers 94 such as the SIM ID codes 95. Then, determining validity of device ID and if invalid, then discarding the request, and if valid, then determining the data routing protocol as a function of the validated device ID code 94 such as the SIM ID code 95 from the associated device/SIM associated protocols 98 stored in the database 92 and retrieving the determined associated protocol.

Next, the remote monitoring method 210 comprises the steps of utilizing the data routing engine 84 for processing the request in accordance with the determined associated data decoding and routing protocol (DRP) 98. Specifically, the data routing engine 84 utilizes the dynamic data decoding process 87 and the dynamic data routing process 88 of the determined associated data decoding and routing protocol 98 to respectively decode and route the data. Once decoded, a step of storing the data in the database along with extraneous meta-data regarding the transmission (e.g., received time/date, data size, checksum, et cetera) is performed thereby defining data 97 which is also flagged for disposition in the form of, for example, holding the data, pushing the data to another web service, uploading data to a remote system, sending an SMS message, mailing the data, et cetera. Then, executing pull (path B) or a push (Path C) data distribution in accordance with the instruction of the determined associated data decoding and routing protocol 98.

Accordingly, when the centralized data routing engine 84 receives a contiguous encoded data package 46 from the packaging and transmission module 40 it validates the device serial or ID code against the database 92 to determine who the user is. If validation occurs, it continues processing by loading the proper data decoding and routing protocol 86 for the device based on the device serial or ID number or code and then performs the steps of decoding the data package 46 based on the associated decoding process 87, recording the data in the database 92, and starting the associated data routing processes 88 if validation does not occur, it disconnects the device. Each data decoding and routing protocol 86 obtained from the associated device associated decoding and routing protocols (DRPs) 98 is a code based module that contains a set of instructions on how to decode data and where to route the data when received; known as the data disposition. Every packaging and transmission module 40 is associated with a specific data decoding and routing protocol 86 selected from the device associated decoding and routing protocols 98. Being modularized, data decoding and routing protocol 86 can be modified easily to accommodate bulk changes to data disposition. Or a specific packaging and transmission module 40 can be switched from one protocol to another on the fly to change the disposition of data Dora specific remote monitoring device.

Figures 6, 7:
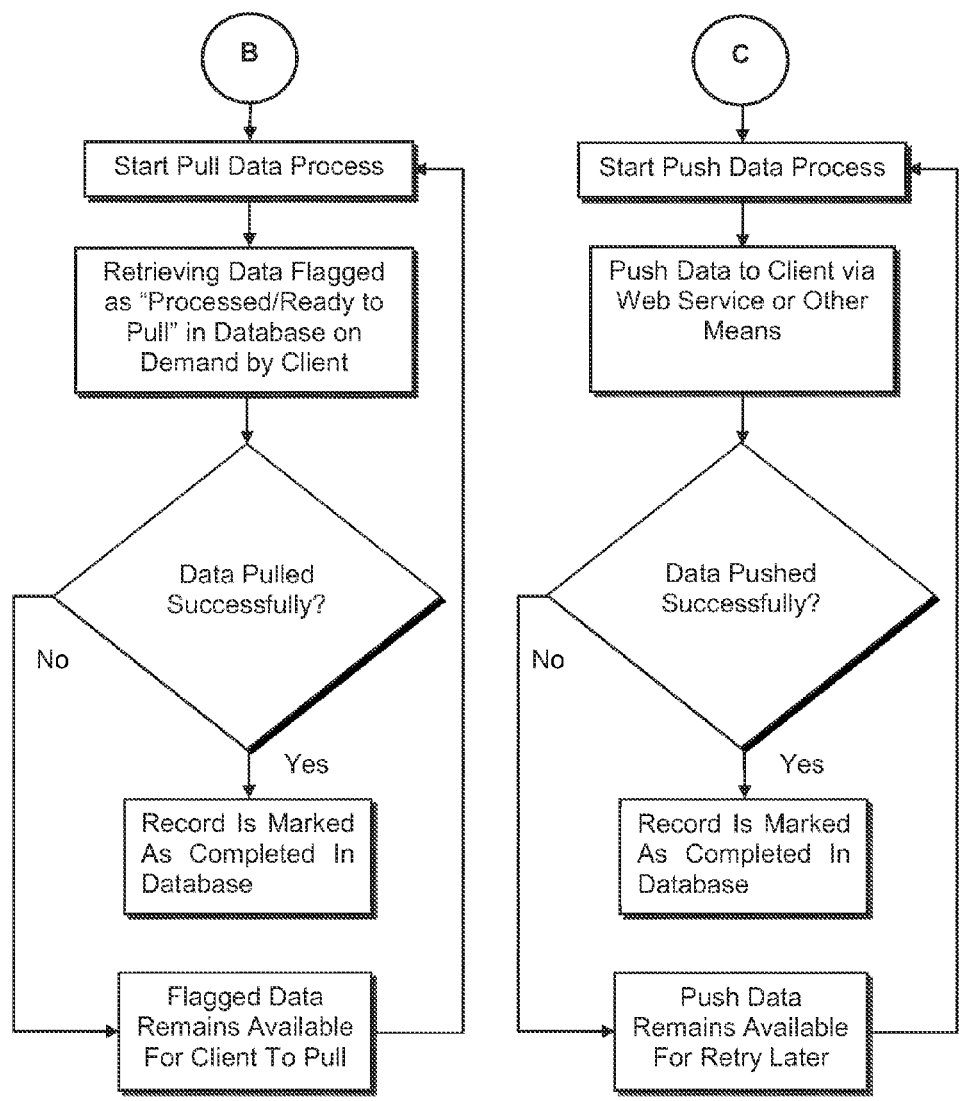

Now with reference to FIGS. 1, 3, and 6, an embodiment of the remote monitoring method 210 further comprises the following steps which outline the pull (path B) data process. Retrieving data 97 flagged as "processed/ready to pull" on demand by a client system 100 through a custom web service 89 set up on, for example the service server system 82 to allow the client system 100 to retrieve the data from the database 92. Then, determining if the data was pulled successfully and if yes, then marking a record 99 in the database that is associated with the pulled data as completed to prevent it being pulled again in future pulls, and if no, then allowing the data flagged as "processed/ready to pull" to remain available for client to pull.

Now with reference to FIGS. 1, 3, and 7, an embodiment of the remote monitoring method 210 further comprises the following steps which outline a push (path C) data process. Pushing data 97 flagged as "processed/ready to push" to client system 100 through, for example, the custom web service 89 set up on the service server system 82 to push the data from the database 92. Then, determining if the data was pushed successfully and if yes, then marking the record 99 in the database 92 that is associated with the pushed data as completed, and if no, then allowing the data flagged as "processed/ready to push" to remain available for a push retry later. The push process would include instructions on sending the data to the client system 100. The data routing engine 84 would initiate the push of data. The receiving process of the client system 100 would respond to the data routing engine 84 with an acknowledgement that the data was received and the data routing engine 84 would mark the record 99 completed to prevent it being resent. If the receiving process did not respond in the affirmative, the data would be resent according to the instructions included in the protocol.

Other cases of data exchange that a protocol may include are, but not limited to, sending an automated email message containing the data, sending an SMS message containing the data, pushing data to an external system such as Microsoft HealthVault, Google Health, Twitter, et cetera.

Accordingly, the remote monitoring system 10 comprising the remote monitoring method 210 provides each data decoding and routing protocol 86 with a specific set of decoding and routing instructions based on the type of device sending the data and the client's specific requirements for receiving that data. Thus, two different clients using the same device types may have identical decoding processes but vastly different routing requirements. Conversely, a single client using different devices may have different decode protocols but identical routing requirements. Each protocol is client/device-specific and applies to that clients set of devices. Therefore, there may be hundreds of different protocols utilized over time.

Additionally, a client may elect to have a specific protocol modified at any time. For instance, if the client wishes to have data sent to a different network or system, simply changing the specific protocol will redirect data from all devices immediately, without having to physically interact with any of the devices.

Figure 8:
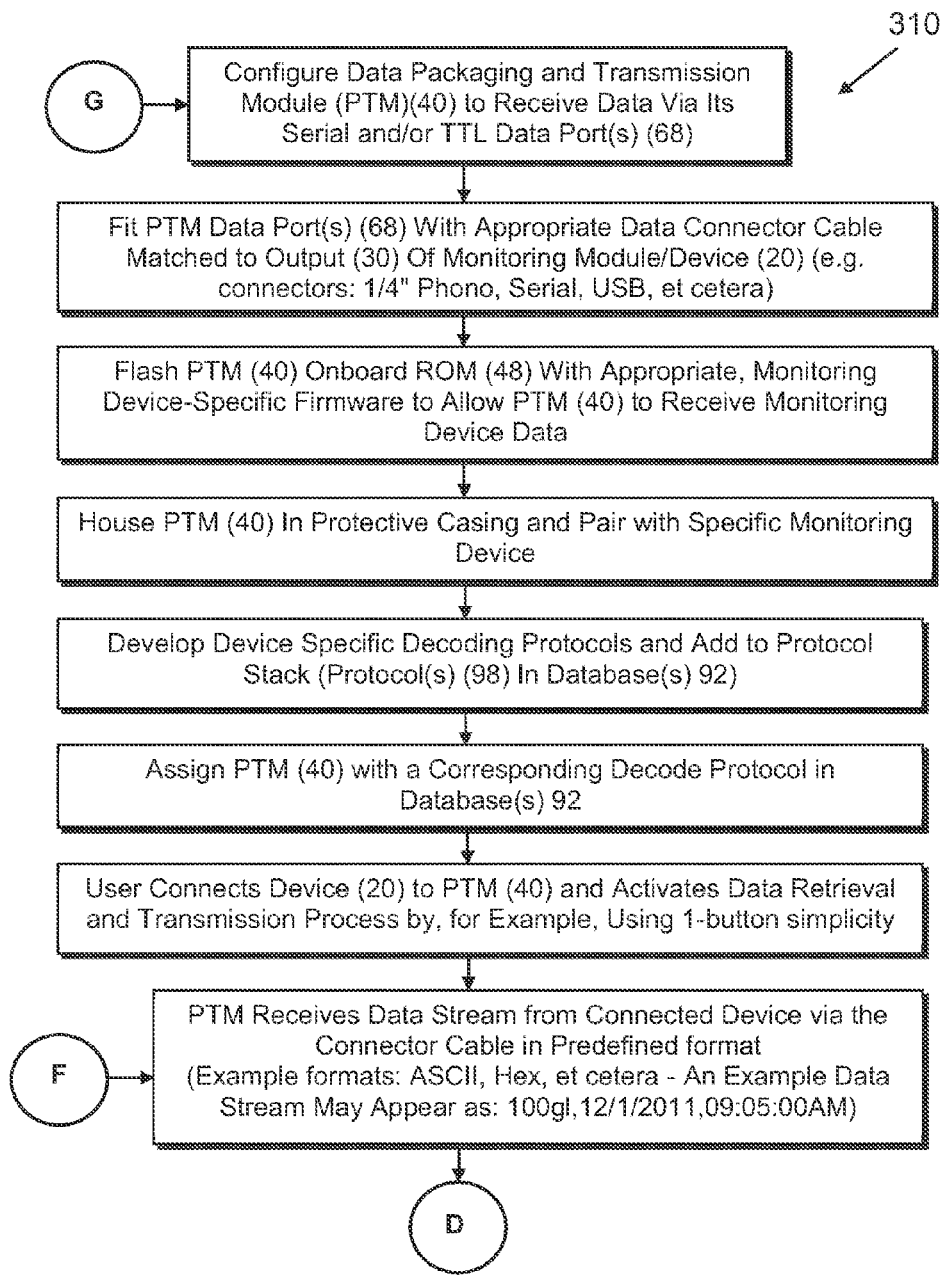
FIGS. 8 through 10 illustrate a process flow chart of an embodiment of a remote monitoring method further detailing the remote monitoring method illustrated in FIGS. 4 through 7.
Figure 9:
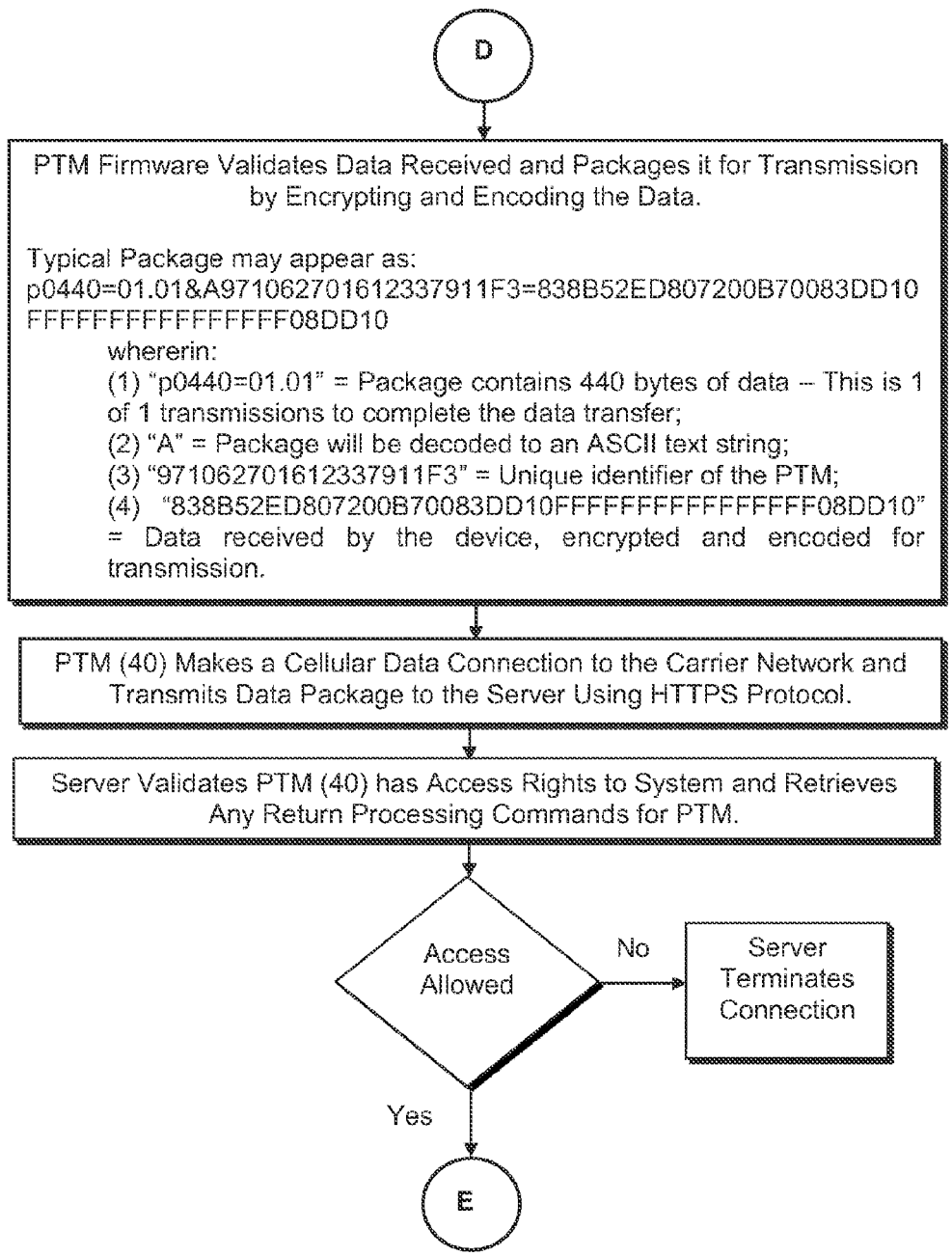
Figure 10:
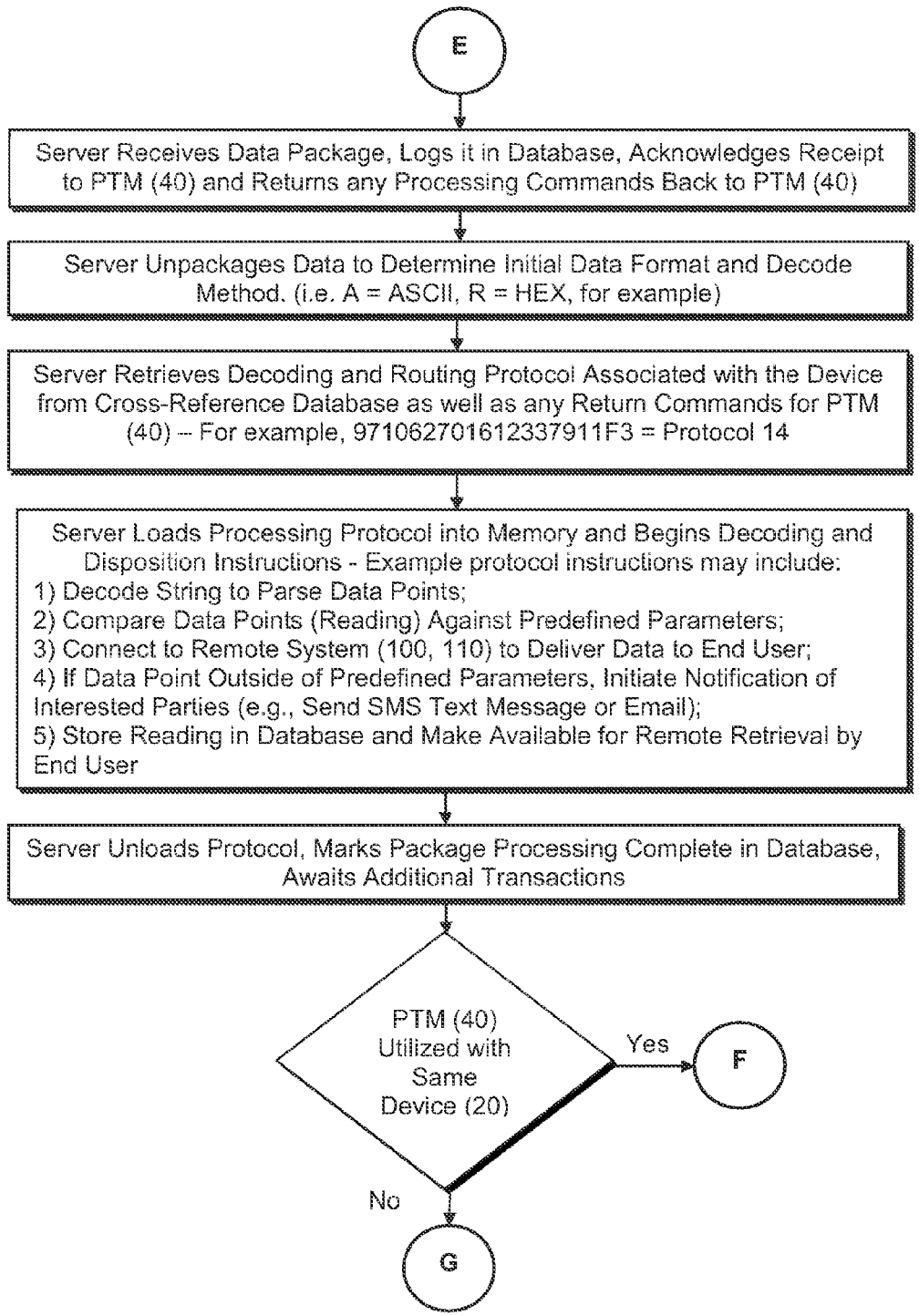

Referring now to FIGS. 8 through 10, and in one embodiment, the remote monitoring system 10 (FIG. 1) is comprised of a remote monitoring method 310 which further details method 210 the remote monitoring method 210 illustrated in FIGS. 4 through 7.

Referring to FIG. 8, an embodiment of the remote monitoring method 310 comprises the following steps. Initially configuring, the data packaging and transmission module or device 40 to receive data via its serial and/or TTL data port(s) 68 by, for example, utilizing selectable jumpers on a motherboard of the device 40. Fitting the data port(s) 68 with an appropriate data connector cable matched to output 30 of monitoring module or device 20. A data connector can take the form of, but is not limited to, a ¼" phono connector, a serial connector, a USB connector, et cetera. Flashing the onboard ROM memory 48 with an appropriate, monitoring module/device-specific firmware to allow it to receive the devices data. Housing the data packaging and transmission module or device 40 in a protective casing and pairing the device 40 with the specific device 20 for which the ROM was flashed. Developing device specific decoding protocol and adding said protocol to a protocol stack or database 92. Assigning the data packaging and transmission module or device 40 that is paired with the specific device 20 a corresponding/associated decoding and routing protocol 98 in the database 92. Connecting, by the user, the specific device 20 to the data packaging and transmission module or device 40 for which the ROM was flashed and utilizing the one on button 75 to activate data retrieval and transmission process thereby providing 1-button simplicity. Utilizing the data packaging and transmission module or device 40 for receiving a data stream from connected device 20 via the connector cable in expected format. In one embodiment, the expected format is in the form of but not limited to, ASCII, Hex, et cetera. A typical data stream may appear as: 100 gl, Dec. 1, 2011, 09:05:00 AM wherein gl stands for glycemic load.

Referring now to FIG. 9, the remote monitoring method 310 further comprises the following steps. Validating, utilizing the device 40 firmware, the data received from monitoring device 20 and packaging it for transmission by encrypting and encoding the data. A typical package may appear as: p0440=01.01&A971062701612337911F3=838B52ED807200870083DD10FFFFFFFFFFFFFFFFF08DD10 wherein the nomenclature "p0440=01.01" refers to a package that contains 440 bytes of data and has a 1 of 1 transmissions to complete the data transfer and wherein the nomenclature "A" refers to a package that will be decoded to an ASCII text string and wherein the nomenclature "971062701612337911F3" refers to a unique identifier of the data packaging and transmission module or device 40 and wherein the nomenclature "838B52ED807200870083DD10FFFFFFFFFFFFFFF-F08DD10" refers to the data that is received, encrypted, and encoded for transmission by the device 40. Making, utilizing the device 40, a cellular data connection to the carrier network 78 and transmitting data package to the server 82 using HTTPS protocol. Utilizing the server for validating that the connected device 40 has access rights to the server system 82 and retrieving any return processing commands for the connected device 40. If access is denied, then the server 82 terminates connection and if access is allowed, then the remote monitoring method 310 further comprises the steps illustrated in FIG. 10.

Accordingly, and with reference to FIG. 10, an embodiment of the remote monitoring method 310 further comprises the following steps upon the above noted access being allowed. Receiving, utilizing the server 82, the data package, loggin it in the database 92, and acknowledging receipt to the device 40, and returning any processing commands back to device 40. Unpackaging, utilizing the server 82, the data package to determine initial data format and decode method (ie. A=ASCII, R=HEX, et cetera). Retrieving, utilizing the server 82, the corresponding processing protocol associated with the above noted specific device from database 92 and specifically, from the device associated data decoding and routing protocols 98 stored in database 92 as well as any return commands for the device 40. For example, the above noted nomenclature 971062701612337911F3 can be defined to correspond with or have an association with a protocol 14. Loading, utilizing the server 82, the associated processing protocol into memory and beginning the decoding and disposition instructions therein. In one embodiment, an example of the protocol instructions of the associated processing protocol may include: decoding the data string to parse data points; comparing device data points (reading) against predefined parameters; connecting to the remote system to deliver data to end user; and if data point is outside of predefined parameters, initiating a notification of interested parties (e.g., send SMS text message or email); and storing data or reading in database 92 and make available for remote retrieval by end user. Unloading, the associated processing protocol and utilizing the server 82 to mark package processing complete in database 92. Awaiting additional transactions and utilizing the device 40 again with same or new device.

Example Embodiments of Use and Operation

Referring to FIGS. 1 through 11, and in a specific example embodiment of use and operation, the remote monitoring system 10 comprising method 210, further detailed by method 310, is utilized by a Supplier (service provider, owner, administrator, et cetera) in capturing and transmitting blood glucose readings from a remote patient (user) for a disease management company (client) referred herein as Company A. Company A would commission the Supplier (service provider, owner, administrator, et cetera) to create a device 40 to read data from its designated glucose meters each being an example of a monitoring module or device 20. The Supplier (service provider, owner, administrator, et cetera) would create a device $D_N$, embedding the data packaging and transmission module or device 40 therein. The data packaging and transmission module or device 40 would include a connection mechanism such that data from the glucose meter could be read or passed to the embedded packaging and transmission module or device 40. The glucose meter manufacturer would provide details on how to read and interpret the data received from the glucose meter. These instructions would be encoded into a new data decoding and routing protocol 98, specific to that glucose meter.

Additionally, Company A would instruct the Supplier (service provider, owner, administrator, et cetera) on what to do with the data received. For instance, Company A may provide a web service 114 via manufacturer/distributer server system 110 and ask the Supplier (service provider, owner, administrator, et cetera) to push all data received immediately to their web service so they can track glucose readings in real-time. This action would also be coded into the data decoding and routing protocol 98.

Thus, when deployed to patients, the patient would connect their glucose meter to the device 40 to form an example of device $D_N$ and the transmission process would begin. The data packaging and transmission module or device 40 embedded in the device $D_N$ would receive the data from the glucose meter and package it as delineated above. Then, it would connect to the local cellular network 78, make the data connection to the Internet 80 and transmit its data to the centralized data routing engine 84 of the server 82. The data routing engine 84 validates the connection, receives the data and logs it in the database 92. The data routing engine 84 returns an acknowledgement to device 40 that data was received and the device 40 will await the next transaction. If the device 40 does not receive an affirmative acknowledgement, it will retry to send the contiguous data blocks, packets, or packages 46 until it receives a proper acknowledgement.

When the data routing engine 84 receives a communication attempt, it validates the incoming request 96 to ensure it recognizes the data packaging and transmission module or device 40. If valid, the data routing or processing engine 84 receives and logs the data and provides an affirmative acknowledgment to the data packaging and transmission module or device 40. The data routing engine 84 cross-references the device ID with at least one device associated data decoding and routing protocol 98 and loads the proper protocol instructions. It then decodes the contiguous data blocks, packets, or packages 46 received according to those instructions and begins disposition of the data contained therein including the monitored data 28.

In the case of Company A, the protocol specifies to send the glucose data immediately to the specified web service 114. Once the data has been decoded, the data routing engine 84 will format the data and immediately make a connection to Company A's web service 114. If the data is sent successfully, it will make the record 99 sent and no further action occurs for this transmission. If no acknowledgement is received, the data routing engine 84 marks the record 99 for retry and continues to attempt to send the data 97 to Company A at regularly specified intervals until successful.

In this way, blood glucose data is received from the patient in real time by Company A. Accordingly, Company A realizes absolute flexibility in managing its data without having to manage devices or inconvenience patients.

If Company A wishes to implement a new glucose meter for a set of patients, a new data decoding and routing protocol 98 can be created and assigned to those patients devices. No patient or device intervention is required. If Company A wishes to send data for a specific set of patients to a different system, a new data decoding and routing protocol 98 can be created and assigned to those patients devices. No patient or device intervention is required. If Company A wishes to send all patient data to a new tracking system, the existing protocol can be modified to change the data routing with no patient or device intervention. If Company A wishes to receive only a subset of data, such as glucose readings that exceed a particular threshold, the existing protocol can be modified to analyze the reading and only send if that threshold is met. If Company A wishes not to receive data in real time, the data routing protocol can be modified such that data can be stored on the service server system 82 and Company A can pull that data 97 on demand.

In another example embodiment of use and operation, the remote monitoring system 10 comprising method 210, further detailed by method 310, is utilized by a vending machine which is another example of a monitoring module or device 20 wherein the vending machine is connected to the packaging and transmission module or device 40 and the vending machine is programmed to transmit data, such as inventory levels or availability status, to the data routing engine 84 for processing and delivery as delineated above.

In another example embodiment of use and operation, the remote monitoring system 10 comprising method 210, further detailed by method 310, is utilized by a utility meter which is another example of a monitoring module or device 20 wherein the utility meter can send data to the data routing engine 84 for processing and delivery as delineated above.

The remote monitoring system 10 comprising method 210, further detailed by method 310 can also be used in a non-wireless manner for processing and routing data as delineated above.

Example Embodiment of Setup, Use, and Operation

Figure 11:
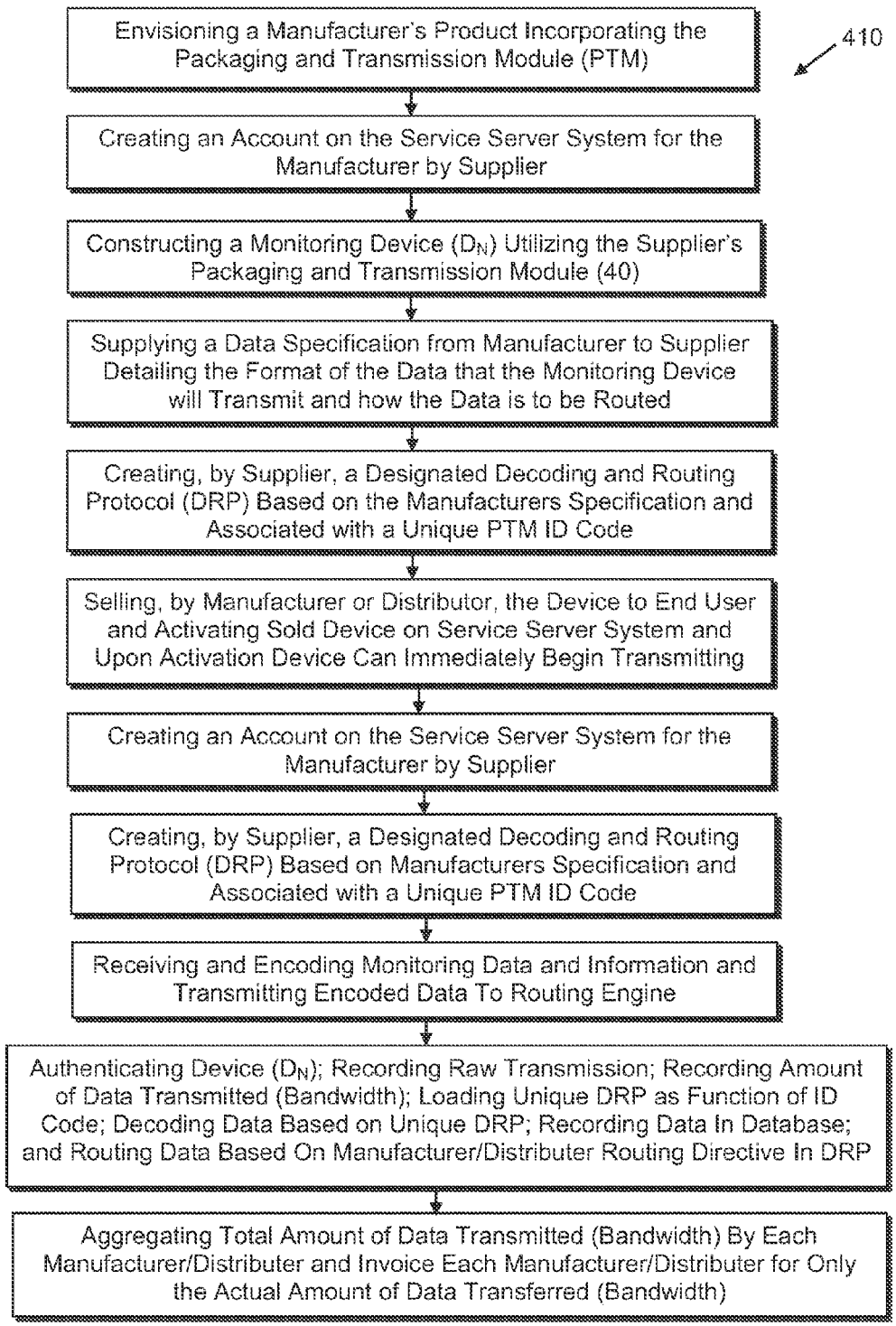
FIG. 11 is a flow diagram illustrating an embodiment of operational setup, use, and operation of an embodiment of the remote monitoring system and method.

Referring now to FIG. 11, and back to FIGS. 1 through 10, an example embodiment of a general setup, use, and operation method 410 will now be further explored. At the outset, a manufacturer purchases the packaging and transmission module (PTM) 40 of the remote monitoring system 10 from the Supplier for a manufacturer's product that has been envisioned to incorporate its use. The Supplier creates an account for the manufacturer on the service server system 82 if one does not exist, delivers the data packaging and transmission module (PTM) or device 40 for the envisioned product to the manufacturer, and grants the manufacturer access to a device management console 108.

The manufacturer provides the Supplier a specification detailing the format of the data in which the device will be transmitting and will indicate where the incoming data is to be stored and routed. Additionally, the delivered data packaging and transmission module or device 40 incorporates the monitoring module and wireless specifications supplied by the manufacturer.

The manufacturer constructs each monitoring device which can each be exemplified by device $D_N$ wherein N is a positive integer greater than zero utilizing the Supplier's data packaging and transmission module 40 such that data collected by the monitoring module 20 is sent to the data packaging and transmission module 40 via a standard serial connection. In turn, the data packaging and transmission module 40 captures or receives the monitored data, encodes the monitored data, and transmits the contiguous data block, packet, or package 46 comprising the encoded monitored data and the encoded ID code or identifier to the service server system 82.

An alternate path would be where the manufacturer sells the finished product (each monitoring device $D_N$) to a distributor. The distributor receives the devices and registers with the Supplier. The Supplier creates an account for the distributor on the service server system 82 if one does not already exist, and the distributor is given access to the device management console 108 via, for example, client system 100. The distributor must also then indicate how the data for their devices should be decoded and routed.

The Supplier creates a designated decoding and routing protocol 98 to handle data received from the device, based on the manufacturer's specification. The decoding and routing protocol 98 is associated with a unique device ID code or identifier 54 such as a SIM ID code 55. This information is stored in the Supplier's database 92.

The manufacturer for distributor) sells each monitoring device $D_N$ to an end user and activates the device on the service server system 82. Once activated, the device can immediately begin transmitting data to the service server system 82 via the data packaging and transmission module or device 40. Manufacturer (or distributor) ma continue to activate devices utilizing the device management console. Each activated device is added to that manufacturers or distributors group of devices.

The packaging and transmission module or device 40 receives data from the monitoring module or device 20 and encodes that data along with other device specific information. The data packaging and transmission module 40 packages the data and transmits directly to the data routing engine 84 of the service server system 82.

The data routing engine 84 is a software program running on the server that receives device data from the data packaging and transmission module 40. The data routing engine 84 performs the following functions: Authenticates the device $D_N$; Records the raw transmission; Records the amount of data transmitted; Loads the proper decoding and routing protocol 98 for the device based on its verified ID; Decodes the data based on the decoding process of the ID associated decoding and routing protocol 98; Records the data 97 in the database 92; Routes data 97 based on the manufacturer/distributor routing directive or, in other words, the routing process 88 of the ID associated DRP 98.

This data disposition can include a variety of options comprising: A forward direct option wherein data is forwarded directly to the manufacturer or their designee's location; A store and forward option wherein data is stored on the Supplier's servers database and forwarded at specific intervals; A store and retrieve option wherein data is stored on the Supplier's servers database and retrieved by the manufacturer or their designee at a later date; and a store and host option wherein data is stored on the Supplier's servers database and accessed via an application created and hosted by the Supplier.

If the manufacturer/distributor has selected the forward direct option then the routing engine immediately forwards the data to the proper server location via internet, email, SMS message or other specified electronic delivery method. If the manufacturer/distributor has selected the store and forward option then the routing engine queues the data for delivery and transmits at the specified time. If the manufacturer/distributor has selected the store and retrieve option then the routing engine queues the data for retrieval by the manufacturer/distributor. Finally, if the manufacturer/distributor has selected the store and host option then the routing engine processes the data and feeds it to the supporting application.

Each device or group of devices can have a different routing option. Thus the functionality of the data routing engine 84 allows a manufacturer to create a single device that can be utilized by multiple groups of users, each requiring a different disposition of their data. The same device can be used by different distributors and end users without the manufacturer having to invest in any significant supporting infrastructure.

Another potential path may occur when a distributor transfers devices to another distributor or needs to have data for a group of devices routed to another location. At any time a manufacturer/distributor may change the data routing options for a device or group of devices. If devices are being transferred to another distributor, that distributor would be required to notify Supplier and establish an account if one does not already exist. The data routing engine 84 therefore, provides the manufacturer the flexibility to change where data is sent without touching any of the devices.

On a periodic basis (generally a monthly billing period), the Supplier aggregates the total amount of data transmitted by all devices $D_N$ activated by the manufacturer or distributor. The Supplier multiplies the amount of data by the contracted data rate and sends manufacturer and/or distributor a single bill for the actual amount of data transferred for all devices.

More specifically, the Supplier tallies the total bandwidth used by all of the active devices. The Supplier purchases that amount of bandwidth from the wireless carrier in bulk. The Supplier then tallies the total bandwidth used by all devices activated by each manufacturer/distributor, and provides them a single bill for their aggregate data usage at the contracted rate. Thus the manufacturer/distributor is charged for only the data transmitted with no wasted bandwidth.

The manufacturer/distributor may log into device management console 108 at any time to activate additional devices, deactivate devices, view data transfer usage for devices or change the data routing options for their devices.

The above delineation of the system 10, including its methods and aspects demonstrate the industrial applicability of this invention.

Moreover, it should be apparent that numerous modifications and adaptations may be resorted to without departing from the scope and fair meaning of this invention as set forth hereinabove and as described hereinbelow by the claims.

I claim:

1. A remote monitoring method, said method comprising:
   utilizing each of a plurality of remote monitoring devices for forming a plurality of contiguous data packages each comprising encoded monitored data and a unique identifier;
   wirelessly transmitting each of the plurality of contiguous data packages from each of the plurality of remote monitoring devices to a cellular network;
   transferring each of the plurality of contiguous data packages from the cellular network to a server;
   processing, with the server, each of the plurality of contiguous data packages with at least one of a plurality of predefined decoding and routing protocols selected as a function of each unique identifier contained within each of the plurality of contiguous data packages for obtaining a plurality of decoded data sets each comprising decoded monitored data and an associated routing directive;
   routing each of the plurality of decoded data sets according to its associated routing directive;
   aggregating a total amount of bandwidth used by each wireless transmission of each of the plurality of contiguous data packages; and
   invoicing singularly an entity for only the aggregated amount of bandwidth used by each wireless transmission of each of the plurality of contiguous data packages having its unique identifier associated with the entity.

2. The method of claim 1, wherein the monitored data is correlative to at least one physiological measurement.

3. The method of claim 1, wherein the monitored data is correlative to at least one human physiological measurement.

4. The method of claim 1, wherein the monitored data is correlative to at least one utility measurement.

5. The method of claim 1, wherein the monitored data is correlative to at least one inventory measurement.

6. The method of claim 1, comprising comparing the monitored data within each of the plurality of decoded data sets against at least one predefined parameter for determining if the monitored data is outside of at least the one predefined parameter and initiating a notification upon a determination of the presence of the monitored data being outside of at least the one predefined parameter.

7. A remote monitoring method, said method comprising:
   providing a plurality of remote data packaging and transmission devices each connectable to a data monitoring device configured to collect data correlative to at least one human physiological measurement for defining monitored data;

utilizing each of the plurality of remote data packaging and transmission devices for forming a plurality of contiguous data packages each comprising encoded monitored data and a unique identification code;

wirelessly transmitting each of the plurality of contiguous data packages from each of the plurality of remote data packaging and transmission devices to a cellular network;

transferring each of the plurality of contiguous data packages from the cellular network to a server;

processing, with the server, each of the plurality of contiguous data packages with at least one of a plurality of predefined decoding and routing protocols selected as a function of each unique identification code contained within each of the plurality of contiguous data packages for obtaining a plurality of decoded data sets each comprising decoded monitored data and an associated routing directive;

routing each of the plurality of decoded data sets according to its associated routing directive to at least one of a plurality of predefined end points for disposition;

aggregating a total amount of bandwidth used by each wireless transmission of each of the plurality of contiguous data packages; and invoicing singularly an entity for only the aggregated amount of bandwidth used by each wireless transmission of each of the plurality of contiguous data packages having its unique identifier associated with the entity.

8. The method of claim 7, comprising comparing the monitored data within each of the plurality of decoded data sets against at least one predefined parameter for determining if the monitored data is outside of at least the one predefined parameter and initiating a notification upon a determination of the presence of the monitored data being outside of at least the one predefined parameter.

9. A remote monitoring system comprising:

a plurality of configurable remote data packaging and transmission devices each with an interchangeable firmware module and an interface connector capable of receiving differing data types defining monitored data via differing connection types;

said plurality of configurable remote data packaging and transmission devices configured in form a plurality of contiguous data packages each comprising encoded monitored data and a unique identifier;

said plurality of configurable remote data packaging and transmission devices configured to wirelessly transmit each of said plurality of contiguous data packages from each of said plurality of configurable remote data packaging and transmission devices to at least one cellular network configured to transfer each of said plurality of contiguous data packages from at least said one cellular network to a server;

said server configured to process each of said plurality of contiguous data packages with at least one of a plurality of predefined processing protocols selected as a function of each said unique identifier contained within each of said plurality of contiguous data packages for obtaining a plurality of decoded data sets each comprising decoded monitored data and an associated routing directive;

said server configured to route each of said plurality of decoded data sets according to its associated routing directive;

said server configured to aggregate a total amount of bandwidth used by each said wireless transmission of each of said plurality of contiguous data packages; and said server configured to invoice singularly an entity for only said aggregated amount of bandwidth used by each wireless transmission of each of said plurality of contiguous data packages having its unique identifier associated with said entity.

10. The remote monitoring system of claim 9 wherein said server is configured to compare said monitored data within each of said plurality of decoded data sets against at least one predefined parameter and to initiate a notification upon each determination of a presence of said monitored data being outside of at least the one predefined parameter.

11. The remote monitoring system of claim 9 wherein the monitored data is correlative to at least one physiological measurement.

12. The remote monitoring system of claim 9 wherein the monitored data is correlative to at least one human physiological measurement.

13. The remote monitoring system of claim 9 wherein the monitored data is correlative to at least one utility measurement.

14. The remote monitoring system of claim 9 wherein the monitored data is correlative to at least one inventory measurement.

15. A remote monitoring system comprising:

a plurality of remote data packaging and transmission devices each connectable to a data monitoring device configured to collect data correlative to at least one human physiological measurement for defining monitored data;

said plurality of remote data packaging and transmission devices configured to form a plurality of contiguous data packages each comprising encoded monitored data and a unique identifier;

said plurality of remote data packaging and transmission devices configured to wirelessly transmit each of said plurality of contiguous data packages from each of said plurality of remote data packaging and transmission devices to a cellular network configured to transfer each of said plurality of contiguous data packages from the cellular network to a server;

said server configured to process each of said plurality of contiguous data packages with at least one of a plurality of predefined processing protocols selected as a function of each said unique identifier contained within each of said plurality of contiguous data packages for obtaining a plurality of decoded data sets each comprising decoded monitored data and an associated routing directive;

said server configured to route each of said plurality of decoded data sets according to its associated routing directive;

said server configured to aggregate a total amount of bandwidth used by each said wireless transmission of each of said plurality of contiguous data packages; and said server configured to invoice singularly an entity for only said aggregated amount of bandwidth used by each wireless transmission of each of said plurality of contiguous data packages having its unique identifier associated with said entity.

16. The remote monitoring system of claim 15 wherein said server is configured to compare said monitored data within each of said plurality of decoded data sets against at least one predefined parameter and to initiate a notification upon each determination of a presence of said monitored data being outside of at least the one predefined parameter.

17. The remote monitoring system of claim 15 wherein the monitored data is correlative to at least one physiological measurement.

18. The remote monitoring system of claim 15 wherein the monitored data is correlative to at least one human physiological measurement.

19. The remote monitoring system of claim 15 wherein the monitored data is correlative to at least one utility measurement.

20. The remote monitoring system of claim 15 wherein the monitored data is correlative to at least one inventory measurement.

* * * * *